United States Patent [19]

Murphy

[11] 4,393,761

[45] Jul. 19, 1983

[54] FLOATING KNIFE ASSEMBLY FOR A MEAT DEFATTING MACHINE

[76] Inventor: Robert P. Murphy, 1807 Commercial, St. Joseph, Mo. 64503

[21] Appl. No.: 281,006

[22] Filed: Jul. 6, 1981

[51] Int. Cl.$^3$ .............................................. A22C 17/12
[52] U.S. Cl. ...................................... 99/589; 83/870; 83/874; 99/590
[58] Field of Search ................. 99/537, 538, 539, 540, 99/584, 486, 489–492, 589–591; 83/870, 871, 873, 874; 17/1, 21, 62

[56] References Cited

U.S. PATENT DOCUMENTS

| | | |
|---|---|---|
| 3,249,139 | 5/1966 | Runnells, Jr. et al. . |
| 3,504,721 | 4/1970 | Townsend . |
| 3,559,707 | 2/1971 | Townsend . |
| 3,844,207 | 10/1974 | Townsend . |
| 4,246,837 | 1/1981 | Chenery .............................. 99/538 |

Primary Examiner—Philip R. Coe
Assistant Examiner—Timothy F. Simone
Attorney, Agent, or Firm—Litman, Day & McMahon

[57] ABSTRACT

A floating knife assembly is provided to be used in conjunction with a meat defatting machine to trim a portion of a layer of fat from a piece of meat while leaving a desired thickness of fat layer thereon.

The knife assembly includes a gauge plate which engages the piece of meat, riding on an upper surface thereof as the meat is urged toward the knife. The gauge plate and knife are mounted on a linkage system which allows the gauge plate and knife to float upwardly or downwardly. The distance between the knife and gauge plate is selectively adjustable to accommodate pieces of meat of different thickness.

8 Claims, 8 Drawing Figures

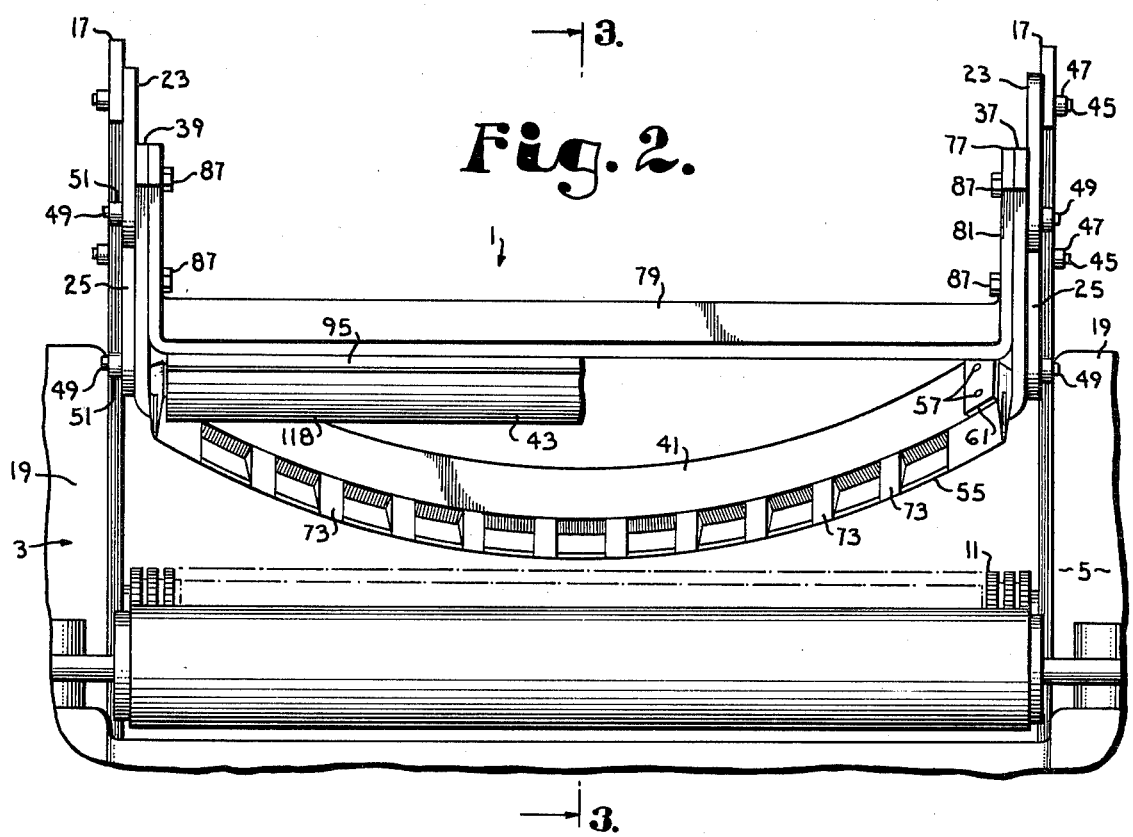
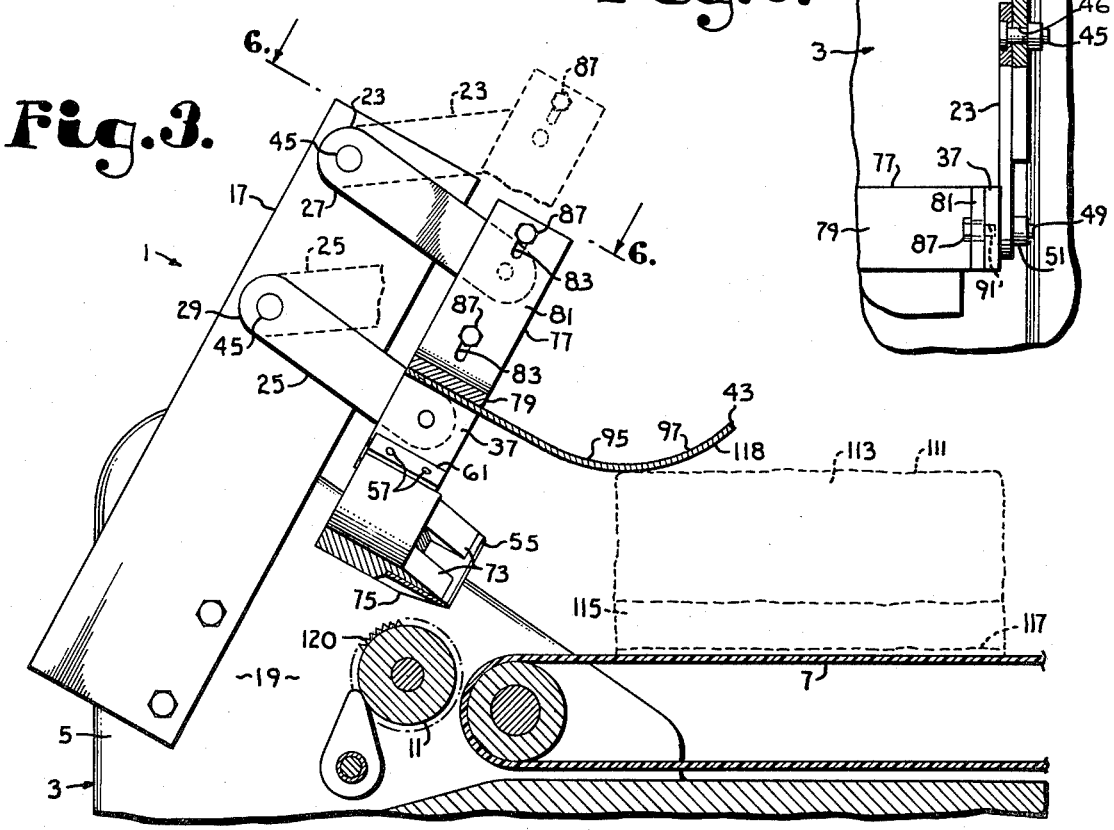

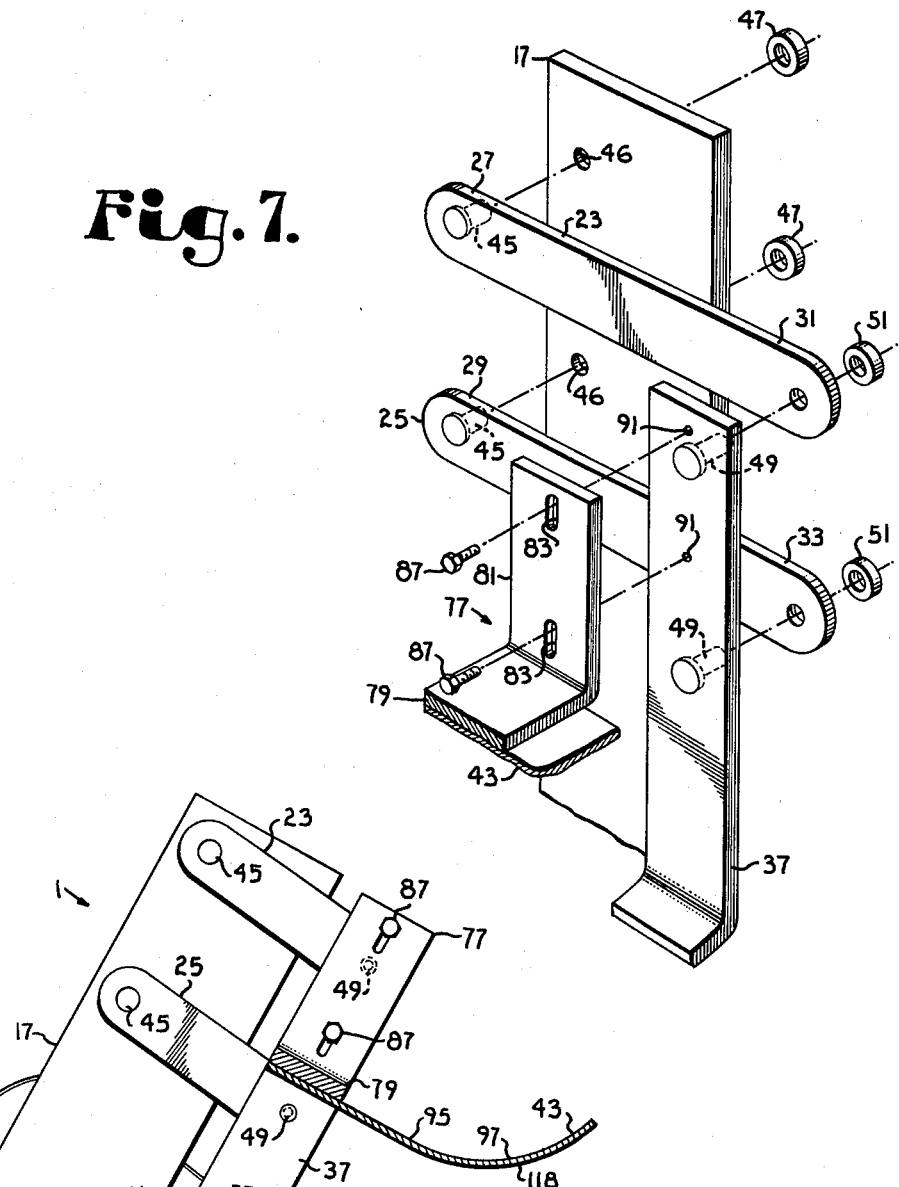
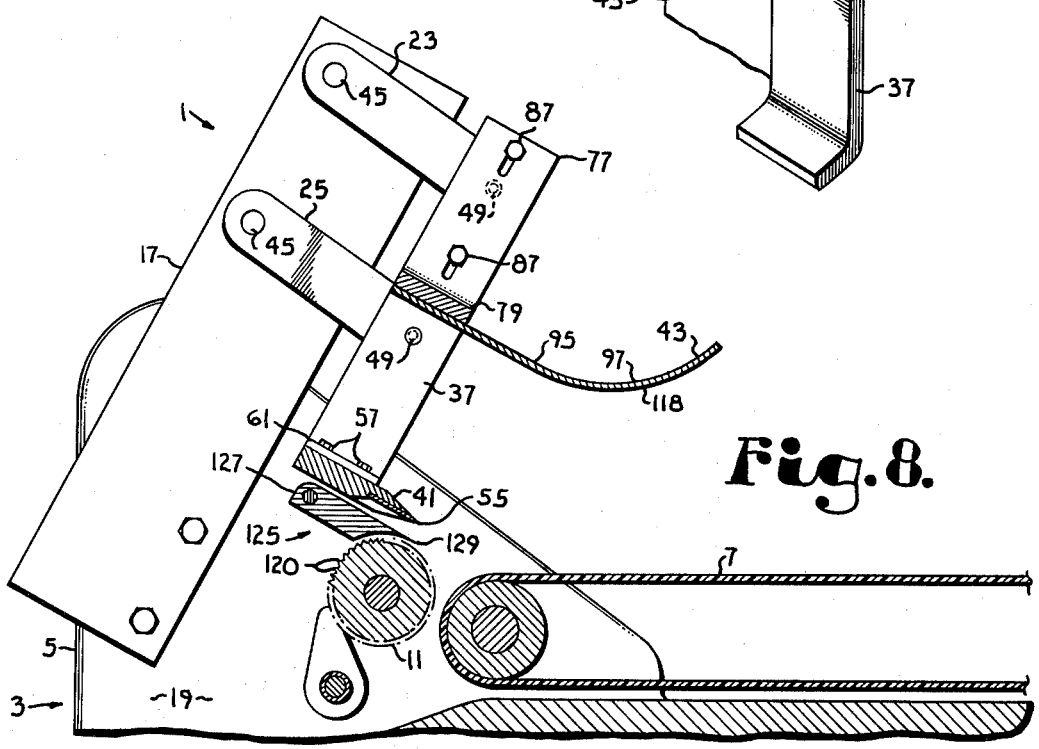

FLOATING KNIFE ASSEMBLY FOR A MEAT DEFATTING MACHINE

BACKGROUND OF THE INVENTION

This invention relates to meat defatting machines in general and in particular, to such machines which include thereon, a floatable defatting knife.

In the meat packing industry defatting machines are used which include a defatting knife to trim an excess portion of a fat layer from a large piece of meat such as a shoulder ham (Boston Butt) or the like prior to selling the resulting meat product to a customer. Some of these machines also incorporate a deskinning knife which allows an outer skin layer attached to the fat to be removed while simultaneously removing the excess portion of the fat layer.

In most instances, the meat packing company is allowed to leave a certain thickness of fat layer on the resulting meat product. The thickness of the fat layer so remaining is subject to an agreement between the meat packing company and its customers. Usually penalties are involved if the meat packer furnishes meat which has a fat layer thickness which exceeds the specified acceptable amount. Further, it is economically desirable to assure that the remaining fat layer equals the acceptable thickness. Therefore, it is desirous when trimming portions of the fat layer from each piece of meat to leave the desired thickness of fat layer on the meat in the most exact manner possible.

It has been found that butchered animals such as hogs or cows that are of the same age group generally exhibit, on each particular cut of meat therefrom, a red meat thickness that is generally constant for the age group of animal. However, the thickness of the fat layer in a given age group can vary depending upon the nature of the feed the particular animal was fed. For example, corn fed animals will display a thicker fat layer than other animals of the same age group which were raised on milo or other feed rations.

The typical meat defatting machine will include a conveyor or the like which will rapidly present to a defatting knife successive cuts of meat. These successive cuts of meat typically are from animals of the same age group but as stated, do not have a constant thickness of fat layer although they do have a constant thickness of red meat layer. Further, these successive pieces of meat are presented to the defatting knife in an orientation wherein the fat layer is resting on a conveyor with the red meat layer facing upwardly.

Examples of the prior art have shown machines which have manually adjustable defatting knives wherein an operator of the defatting machine will observe a piece of meat as it approaches the defatting knife, noting the thickness of the fat layer thereon, and attempt to manually adjust the height the defatting knife is above the conveyor surface to leave a constant thickness of fat layer on each successive piece of meat.

Because of the rapid speed in which the pieces of meat are conveyed to the defatting machine, it is impossible for an operator to continually and accurately adjust the defatting knife for each successive piece of meat.

SUMMARY OF THE INVENTION

A floatable defatting knife assembly is provided to be used in conjunction with a meat defatting machine. The floatable knife assembly includes support brackets for the knife, a linkage system, and a knife and gauge plate mounted on the linkage system. The gauge plate is mounted above the knife and the distance between the gauge plate and the knife is selectively adjustable for use with cuts of meat having varying red meat thicknesses and for leaving a desired thickness of a fat layer on the red meat. The knife assembly is mounted on a defatting machine which includes a conveyor to convey the pieces of meat toward the defatting knife and a gripper roller having longitudinal teeth or serrations thereon which engages the piece of meat propelling it past the defatting knife.

When a piece of meat approaches the defatting knife on the conveyor, it will engage a bottom surface of the gauge plate forcing the gauge plate and floatable knife upwardly a certain extent depending upon the total thickness of the piece of meat. The distance between the gauge plate and the knife itself has been adjusted to equal the thickness of the red meat portion of the piece of meat and the allowable thickness of the fat layer portion to be left on the meat. As the meat is urged by the gripping roller past a knife blade, a portion of the fat layer is separated from the piece of meat leaving the desired thickness of fat layer on the red meat. After the piece of meat progresses past the knife assembly, gravity will urge the knife assembly downwardly in position to engage the next piece of meat.

OBJECTS OF THE INVENTION

Therefore, the objects of the present invention are: to provide a floatable knife assembly to be used in conjunction with a meat defatting machine to trim portions of a layer of fat from successive pieces of meat each having a fat layer thereon of varying thickness while leaving a constant remaining thickness of fat layer thereon; to provide such a floatable knife assembly which includes support members attached to a conventional meat defatting machine, pivotal links mounted thereon, a defatting knife mounting bracket to mount the defatting knife to the links and a gauge plate mounted on the mounting bracket; to provide such a knife assembly which will allow the defatting knife to float upwardly or downwardly automatically upon engaging each successive piece of meat; to provide such a floatable knife assembly which includes a gauge plate which is selectively adjustable relative to the knife such that pieces of meat having varying red meat thicknesses can be accomodated by a single knife assembly; and to provide such a floatable knife assembly which is simple in design, easy to manufature, capable of automatic actuation, durable in use and particularly well adapted for the intended usage thereof.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a fragmentary enlarged front elevational view of the defatting machine and the floatable knife assembly with portions broken away to show details thereof.

FIG. 3 is a cross-sectional view of the defatting machine and floatable knife assembly taken generally along line 3—3 in FIG. 2.

FIG. 6 is an enlarged, fragmentary cross-sectional view taken generally along line 6—6 in FIG. 3 showing details of the floatable knife linkage system.

FIG. 7 is an enlarged fragmentary exploded perspective view of a portion of the knife assembly.

FIG. 8 is a cross-sectional view of the knife assembly according to the present invention showing an alternate knife used therewith.

DESCRIPTION OF THE PREFERRED EMBODIMENT

Figure 1:
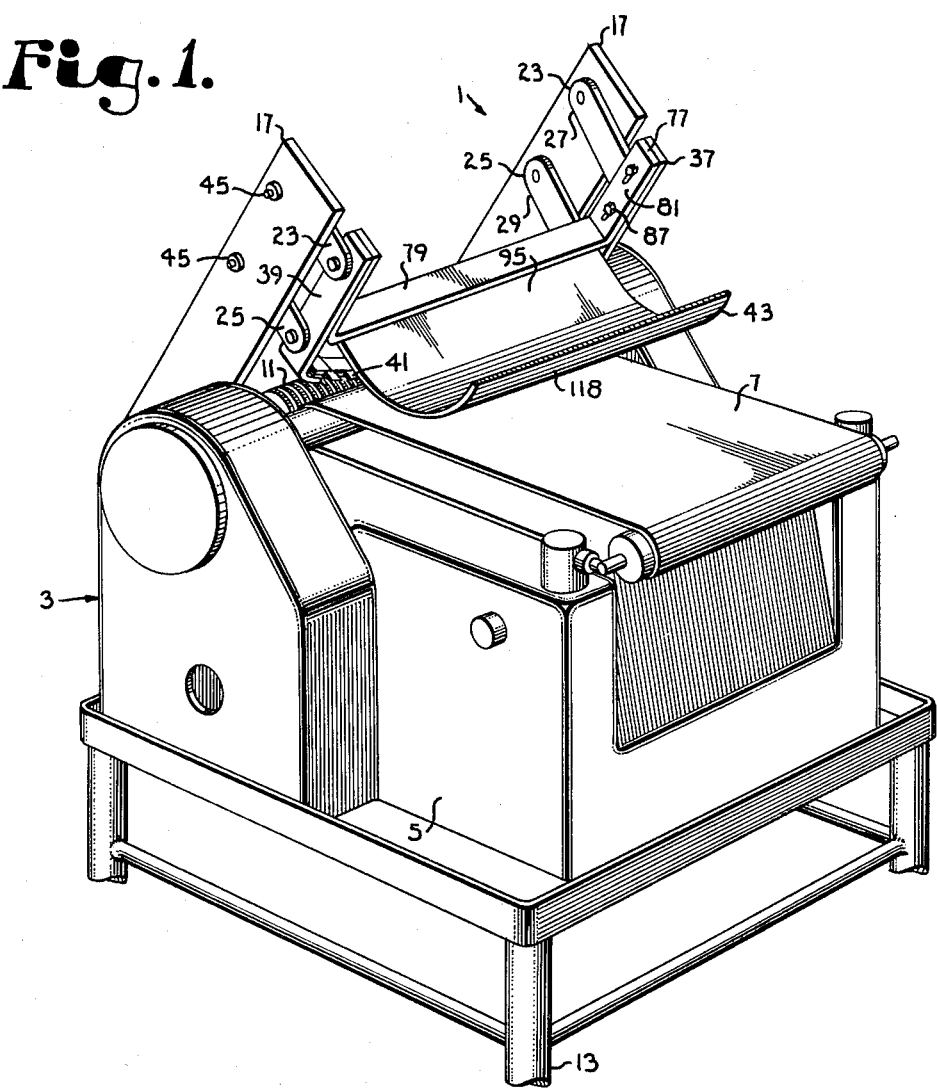
FIG. 1 is perspective view showing a conventional meat defatting machine having attached thereto a floatable knife assembly according to the present invention.
Figure 4:
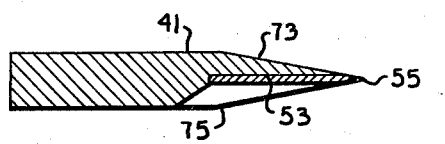
FIG. 4 is an enlarged cross-sectional view of a portion of a knife used in this invention.
Figure 5:
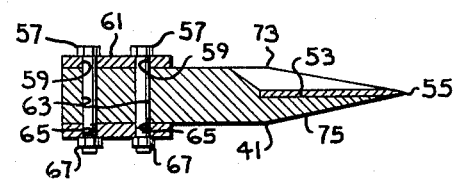
FIG. 5 is a second enlarged cross-sectional view of a different portion of the knife as shown in FIG. 4.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a floating knife assembly according to the present invention shown mounted on a conventional meat product defatting machine 3.

The defatting machine 3 generally comprises a housing 5, a conveyor 7, a gripping roller 11 and a suitable support stand 13. Included with the defatting machine 3 is a motor means (not shown) such as an electric motor, to rotate both the conveyor 7 and the gripping roller 11.

The floatable knife assembly 1 includes spaced parallel and generally vertically oriented support members 17 which are rigidly attached by suitable fasteners to sides 19 of the defatting machine housing 5. As best seen in FIG. 2, the support members 17 substantially straddle the conveyor 7 and gripping roller 11. A pair of spaced parallel upper and lower links 23 and 25 respectively are pivotally attached at first ends thereof 27 and 29 respectively to each support member 17. At second ends 31 and 33 thereof respectively, the links 23 and 25 have pivotally attached thereto mounting plates 37 and 39. As best shown in FIG. 3 the mounting plates 37 and 39 are spaced from and substantially parallel with the associated support member 17 forming a parallelogram therewith.

Securely attached to a lower portion of mounting plates 37 and 39 and extending therebetween is a defatting knife blade holder 41. A gauge plate 43 is attached to and extends between the mounting plates 37 and 39 by means of a gauge plate support bracket 77 at a position generally above that of the knife holder 41. The gauge plate support bracket 77 is connected to the mounting 37 and 39 so as to be selectively adjustable therewith.

The links 23 and 25 include at their first ends 27 and 29 thereof, a shaft or axle 45 extending outwardly therefrom relative to a center of the defatting machine 3. The axles 45 are received through bores 46 in the support members 17. Collars 47 are provided which securely engage axles 45 to retain same within bores 46.

Extending outwardly from mounting plates 37 and 39, are shafts or axles 49 which likewise extend through bores (not shown) in links 23 and 25 and are received in collars 51 attached thereto so as to be retained in link bores (not shown). As such, the links 23 and 25 are rotable both around their points of attachment with the support members 17 and their points of attachment to the mounting plates 37 and 39. Further, the pivoting of the links 23 and 25 allow the knife holder 41 and gauge plate 43 to be positioned over a continuous range of positions relative to gripping roller 11. As shown in FIG. 3, the solid lines show a position of the knife holder near the lower end of the range of positions and the dotted lines show the position of the links when the knife holder is near the upper end of the range of positions.

The knife holder 41 includes a slot 53 therein in which is snugly retained a knife blade 55. The knife holder 41 is securely attached to the mounting plates 37 and 39 by means of bolts 57 extending through bores 59 in a cap plate 61, bores 63 in knife holder 41 and bores 65 in mounting plates 37 and 39 retaining the knife holder 41 onto the mounting plates 37 and 39. Suitable fasteners such as nuts 67 are used to retain the bolts 57 therein.

As best shown in FIG. 2, the knife holder 41 and blade 55 are curved upwardly near outer edges thereof. It is understood that knife holder 41 and blade 55 could be of any suitable design.

The forward portions of the knife holder 41 is beveled to exhibit a substantially wedge shaped configuration. Further, as shown in FIG. 2 the knife holder 41 includes land areas 73 and 75 alternatingly positioned both above and below the blade receiving slot 53.

The gauge plate support bracket 77 includes a substantially horizontal portion 79 extending between leg portions 81. The leg portions 81 abut against the mounting plates 37 and 39 and are adjustably retained therewith. As best shown in FIG. 3 and 7, the leg portions 81 include substantially vertical slots 83. Bolts 87 extend therethrough and are received in threaded apertures 91 in mounting plates 37 and 39.

The gauge plate 43 comprises a substantially planar member having a straight portion 95 extending forwardly and downwardly from the gauge plate support bracket horizontal portion 79 and an upwardly curving forward tip portion 97.

In use, the floating knife assembly 1 is used in conjunction with the defatting machine 3 to separate a portion of a layer of fat of a piece of meat from a fat layer that is to remain on the resulting meat product. As shown in FIG. 3, successive pieces of meat 111 such as a ham are processed by the defatting machine 3. The pieces of meat 111 includes thereon, a red meat portion 113, a fat layer 115 and a skin portion 117. It has been found that animals of the same age have in each individual cut of meat, a red meat layer 113 of constant thickness. However, animals of the same age group which are raised on different feed have a fat layer 115 which is of varying thickness depending on the feed used. As shown in FIG. 3, the pieces of meat 111 approach the knife assembly 1 in the orientation such that the red meat portion 113 is exposed upwardly and the fat layer and skin 115 and 117 are exposed downwardly, substantially in contact with a conveyor 7. In order to achieve a constant thickness of fat layer remaining on the red meat portion 113 of each piece of meat 111, the floatable knife 1 is continuously and automatically biased upwardly and downwardly over a continuous range of positions relative to the conveyor dependent on the total thickness of each successive piece of meat 111, which varies depending on the thickness of the associated fat layer 115.

As shown in FIG. 3, when a piece of meat 111 approaches the knife assembly 1, conveyed thereto by conveyor 7, the red meat portion 113 will engage a bottom surface 118 of the gauge plate tip portion 97, urging the gauge plate 43 upwardly causing the links 23 and 25 to rotate about their points of connection on support members 17 and mounting plates 37 and 39 thereby raising the knife blade 55. As the meat further progresses toward the knife blade 55, the gauge plate 43 rests on the top surface of the meat positioning the knife above the gripping roller 11. As the meat contacts the gripping roller 11, the meat 111 is engaged by longitudinal radially extending teeth or ridges 120 of the gripping roller and is rapidly urged past the knife blade 55.

It is seen that the distace between the gauge plate 43 and the knife blade 55 will determine the thickness of fat layer which is retained on the red meat portion of the meat 111. For example, if the particular cut of meat 111 which is being processed by the defatting machine 3 has a constant red meat layer thickness of three inches and it is desired to retain on successive pieces of meat a fat layer 115 of one-half inch thickness then the distance between the gauge plate 43 and the knife blade 55 is adjusted to be three and one-half inches. This is accomplished by loosening bolts 87 and 89 and adusting the gauge plate support bracket 77 relative to the mounting brackets 37 and 39 such that the vertical distance between the gauge plate 43 and knife blade 57 is three and one-half inches.

After each piece of meat 111 has traversed past the knife assembly 1, gravity will automatically and quickly bias the links 23 and 25 gauge plate 43 and knife holder 41 downwardly such that the knife blade 55 assumes a position directly above the gripping roller 11. Stops (not shown) can be provided to stop the downward rotation of the links 23 and 25 at such a position. When a second piece of meat in succession contacts the gauge plate 43, the gauge plate will be biased upwardly thereby raising the knife blade 55. Since each successive piece of meat has a constant thickness of red meat portion 113, the floatable knife assembly 1 will trim that portion of fat layer 115 which is excessive of the desired amount that is to remain on the red meat portion 113.

FIG. 8 shows the knife assembly 1, mounted on a defatting machine 3, with the knife holder 41 thereof being straight or flat. Further, a deskinning knife 125 is provided to separate the skin layer 117 from that portion of the fat layer 115 which is separated from the piece of meat 111 by the defatting blade 55. The deskinning knife 125 includes a holder 127 and a blade 129. The holder 127 is securely attached to the defatting machine housing 5 by suitable means so as to remain fixed relative to the gripper roller 11. The defatting knife holder 41 and gauge plate 43 function as set forth above and the deskinning knife 125 separates the skin layer 117 from the fat layer 115.

It is to be understood that while certain embodiments of the present invention have been illustrated and described herein, it is not to be limited to the specific forms or arrangement of parts described and shown.

What is claimed and desired to secure by Letters Patent is:

1. A meat defatting machine for severing, from a succession of pieces of meat each having a red meat layer of constant thickness and a fat layer of varying thickness, a portion of said fat layer in excess of a desired total thickness of red meat layer and fat layer; said machine comprising:
   (a) a housing;
   (b) a knife blade;
   (c) conveyor means associated with said housing to present a succession of pieces of meat past said knife blade;
   (d) link means freely pivotally connecting said knife blade to said housing to allow said knife blade to be positioned over a continuous range of positions above said conveyor means;
   (e) gauge means communicating with said knife blade and engageable with said pieces of meat to automatically position said knife blade a distance above said conveyor means to sever from said pieces of meat a portion of the fat layer thereof in excess of a desired total thickness of red meat layer and fat layer remaining after said severance; wherein said link means includes:
      (1) a pair of spaced apart, vertically oriented, parallel support members rigidly connected to said housing;
      (2) a forward pair of spaced apart, vertically oriented, parallel mounting plates aligned with said support members and parallel thereto; said knife blade being mounted on and extending between said forward plates and supported thereby;
      (3) a pair of upper and lower parallel links having each end thereof pivotally connected to an associated one of said support members and mounting plates respectively thereby forming a parallelogram.

2. The machine as set forth in claim 1 wherein:
   (a) said gauge means comprises a gauge plate connected to and extending between said mounting plates at a position relative to said knife blade opposed to that of said conveyor means, said gauge plate extending forwardly of said mounting plates and engageable with said pieces of meat prior to an engagement of said pieces of meat with said knife blade.

3. The machine as set forth in claim 2 wherein:
   (a) said gauge plate includes a flat portion connected to said mounted plates and an upwardly curved tip portion which tip portion engages said pieces of meat as said pieces of meat are biased toward said knife blade and upon the engagement therewith said gauge plate, mounting plates and knife blade are biased away from said roller means to a position where said gauge plate rides on a top surface of said pieces of meat.

4. The machine as set forth in claim 2 wherein:
   (a) the position of said gauge plate relative to said knife blade is selectively adjustable.

5. A defatting machine having a floatable knife assembly for trimming a portion of a layer of fat from a piece of meat having a fat layer on at each one side thereof while leaving a desired thickness of fat on the piece of meat, the machine comprising:
   (a) a housing;
   (b) a conveyor mounted on said housing for advancing successive pieces of meat toward said knife assembly, said successive pieces of meat having fat layers thereon of varying thicknesses with said successive pieces of meat each having a red meat portion of substantially constant thickness, said fat layer engaging said conveyor;

(c) a gripper roller mounted on said housing for propelling said pieces of meat past said knife assembly said gripper roller including a plurality of radially extending ridges which engage said meat fat layer;

(d) a floatable knife assembly including;
  (i) two spaced apart generally vertically oriented support members rigidly attached to sides of said housing at a position thereof relative to said gripper roller opposing said conveyor and straddling said conveyor;
  (ii) two parallel and spaced knife mounting plates aligned with said support members and parallel thereto;
  (iii) a pair of parallel spaced links connecting each of said mounting plates to an associated support member, said links pivotal relative to both said support members and said mounting plates, said support members, links and mounting plates forming parallelograms;
  (iv) a knife blade securely mounted to and extending between said mounting plates near a lower portion each thereof, said knife blade engageable with said meat fat layer; and
  (v) a gauge plate adjustably mounted to and extending between said mounting plates near an upper portion thereof, said gauge plate extending forwardly of said mounting plates and engaging said pieces of meat prior to the engagement therewith by said knife blade; said gauge plate including adjusting means to selectively vary the distance between said gauge plate and said knife such that the distance between said gauge plate and knife blade is equal to the combined desired thickness of said piece of meat after a portion of said meat fat layer has been severed therefrom and whereby;

(e) when said gauge plate engages each of said successive piece of meat, said gauge plate and knife blade are biased to a position where said gauge plate rides on a top surface of said successive pieces of meat positioning said knife blade relative to said fat layer and severing a portion of said fat layer from said piece of meat leaving a desired thickness of fat layer on said red meat layer.

6. A floating knife assembly for use with a meat defatting machine having a conveyor means for moving a succession of pieces of meat past a cutting means, the defatting machine adapted to cut a portion of a layer of fat from each of the successive pieces of meat, each piece having a constant thickness of red meat portion and a variable thickness of fat layer, the fat layer having a surface engageable with the conveyor means; said assembly comprising:
  (a) a support member rigidly connected to said defatting machine and extending upwardly therefrom;
  (b) a defatting knife blade positioned transverse to said conveyor and adapted to engage each successive piece of meat;
  (c) mechanical link means connecting said knife blade to said support member to allow said knife blade to be positioned over a continuous range of positions above said conveyor and fat layer surface; and
  (d) a gauge member connected to said knife blade at a predetermined distance thereabove and adapted to engage a top surface of each successive piece of said succession of pieces of meat and ride thereon as said pieces of meat are urged therepast by said conveyor means, said gauge member urging said knife blade into one of said continuous range of positions relative to said fat layer surface whereby a constant thickness of fat layer is left remaining attached to the red meat portion of each successive piece of meat.

7. The assembly as set forth in claim 6 wherein:
  (a) said link means are pivotally attached to said support member;
  (b) said gauge member is rigidly attached to said knife blade whereby upon the pivoting of said link means said knife blade is urged to rise and fall relative to the conveyor upon the rising and falling of said gauge member as said gauge member engages and rides on top surfaces of successive pieces of meat having varying thicknesses, said successive top surfaces being a varying distance above said conveyor.

8. The assembly as set forth in claim 6, wherein:
  (a) said predetermined distance between said knife blade and said gauge member is selectively adjustable.

* * * * *